US012777489B2

(12) United States Patent
Zhang et al.

(10) Patent No.: US 12,777,489 B2
(45) Date of Patent: Oct. 27, 2026

(54) RETRANSMISSION METHOD AND APPARATUS IN MULTI-TRANSMISSION RECEPTION POINT ARCHITECTURE

(71) Applicant: HUAWEI TECHNOLOGIES CO., LTD., Shenzhen (CN)

(72) Inventors: Yongping Zhang, Beijing (CN); Liuliu Ji, Shanghai (CN); Tie Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 891 days.

(21) Appl. No.: 17/960,656

(22) Filed: Oct. 5, 2022

(65) Prior Publication Data

US 2023/0029373 A1 Jan. 26, 2023

Related U.S. Application Data

(63) Continuation of application No. PCT/CN2021/086240, filed on Apr. 9, 2021.

(30) Foreign Application Priority Data

Apr. 9, 2020 (CN) ......................... 202010273421.7

(51) Int. Cl.
*H04W 72/23* (2023.01)
*H04L 1/08* (2006.01)
*H04W 72/1273* (2023.01)

(52) U.S. Cl.
CPC ............... *H04W 72/23* (2023.01); *H04L 1/08* (2013.01); *H04W 72/1273* (2013.01)

(58) Field of Classification Search
None
See application file for complete search history.

(56) References Cited

U.S. PATENT DOCUMENTS 9,912,504 B2 * 3/2018 Krzymien ............. H04L 1/1896
2017/0272199 A1 9/2017 Dinan
(Continued)

FOREIGN PATENT DOCUMENTS

CN 102891742 A 1/2013
CN 110022615 A 7/2019
(Continued)

OTHER PUBLICATIONS

OPPO., "Enhancements on multi-TRP and multi-panel transmission," R1-1911843, 3GPP TSG RAN WG1 Meeting #99 Reno, USA, Total 11 pages (Nov. 18-22, 2019).
(Continued)

*Primary Examiner* — Phirin Sam
(74) *Attorney, Agent, or Firm* — Leydig, Voit & Mayer, Ltd.

(57) ABSTRACT

A retransmission method and an apparatus in a multi-transmission reception point architecture are provided, to improve HARQ retransmission performance in the multi-TRP architecture. The method includes: receiving first downlink control information from a network device on a first control resource; and receiving a first transmission version of downlink data from the network device based on the first downlink control information. The first transmission version is retransmission data of a second transmission version of the downlink data. Second downlink control information for scheduling the second transmission version is associated with a second control resource. The first control resource and the second control resource are a same control resource, or the first control resource and the second control resource belong to a same resource group.

31 Claims, 6 Drawing Sheets

(56) References Cited

U.S. PATENT DOCUMENTS

| | | | | |
|---|---|---|---|---|
| 2018/0192469 | A1* | 7/2018 | Rathonyi | H04L 69/28 |
| 2018/0309560 | A1* | 10/2018 | Tang | H04L 5/0053 |
| 2019/0215104 | A1 | 7/2019 | Salem et al. | |
| 2019/0363843 | A1 | 11/2019 | Gordaychik | |
| 2020/0106559 | A1 | 4/2020 | Mlaipornsawai et al. | |
| 2021/0014883 | A1* | 1/2021 | Khoshnevisan | H04W 72/23 |
| 2021/0051495 | A1* | 2/2021 | Gupta | H04W 24/04 |
| 2021/0274476 | A1* | 9/2021 | Yi | H04W 72/0453 |
| 2021/0289540 | A1* | 9/2021 | Khoshnevisan | H04W 72/1268 |
| 2022/0159733 | A1* | 5/2022 | Cirik | H04L 5/0053 |
| 2022/0200741 | A1* | 6/2022 | You | H04L 1/18 |
| 2022/0330314 | A1* | 10/2022 | Takeda | H04L 5/0044 |
| 2023/0125953 | A1* | 4/2023 | Hurd | H04L 5/0078<br>370/329 |
| 2024/0298326 | A1* | 9/2024 | Loehr | H04L 5/0048 |
| 2024/0323868 | A1* | 9/2024 | Zhou | H04W 52/0206 |

FOREIGN PATENT DOCUMENTS

| | | | |
|---|---|---|---|
| CN | 110351840 | A | 10/2019 |
| CN | 110784925 | A | 2/2020 |
| WO | 2020029806 | A1 | 2/2020 |

OTHER PUBLICATIONS

Samsung, “RAN1 agreements for NR_eMIMO,” R1-1913604, 3GPP TSG RAN WG1 99 Reno, USA, Total 23 pages (Nov. 18-22, 2019).

Huawei, HiSilicon, “Feature Summary of Enhancements on Multi-TRP/Panel Transmission,” 3GPP TSG RAN WG1 Meeting #99, Reno, USA, R1-1913299, total 88 pages, 3rd Generation Partnership Project, Valbonne, France (Nov. 18-22, 2019).

“Non-coherent Multi-node Transmission in the 5G New Radio,” 3GPP TSG RAN WG1#89, R1-1708898, Hangzhou, P.R. China, Total 3 pages, 3rd Generation Partnership Project, Valbonne, France (May 15-19, 2017).

“3rd Generation Partnership Project; Technical Specification Group Radio Access Network; NR; Physical layer procedures for control (Release 16),” 3GPP TS 38.213 V16.1.0, pp. 1-156, 3rd Generation Partnership Project, Valbonne, France (Mar. 2020).

“3rd Generation Partnership Project; Technical Specification Group Radio Access Network; NR; Physical layer procedures for data (Release 16),” 3GPP TS 38.214 V16.1.0, pp. 1-151, 3rd Generation Partnership Project, Valbonne, France (Mar. 2020).

“3rd Generation Partnership Project; Technical Specification Group Radio Access Network; NR; User Equipment (UE) radio access capabilities (Release 16),” 3GPP TS 38.306 V16.0.0, pp. 1-64, 3rd Generation Partnership Project, Valbonne, France (Mar. 2020).

“3rd Generation Partnership Project; Technical Specification Group Radio Access Network; NR; Radio Resource Control (RRC) protocol specification (Release 16),” 3GPP Ts 38.331 V16.0.0, pp. 1-835, 3rd Generation Partnership Project, Valbonne, France (Mar. 2020).

* cited by examiner

RETRANSMISSION METHOD AND APPARATUS IN MULTI-TRANSMISSION RECEPTION POINT ARCHITECTURE

CROSS-REFERENCE TO RELATED APPLICATIONS

This application is a continuation of International Application No. PCT/CN2021/086240, filed on Apr. 9, 2021, which claims priority to Chinese Patent Application No. 202010273421.7, filed on Apr. 9, 2020. The disclosures of the aforementioned applications are hereby incorporated by reference in their entireties.

TECHNICAL FIELD

Embodiments of this application relate to the field of communications technologies, and in particular, to a retransmission method and an apparatus in a multi-transmission reception point architecture.

BACKGROUND

To improve downlink performance, a multi-transmission reception point (TRP) transmission technology is introduced into a 5th generation (5G) new radio (NR) communications system. The multi-TRP transmission technology means that a plurality of TRPs may serve a same terminal.

In NR, to ensure data transmission reliability, a hybrid automatic repeat request (HARQ) technology is used. When initial transmission data of a transport block (TB) is not successfully received, the terminal may send a negative acknowledgment (NACK) instruction to the TRP, and the TRP retransmits the TB to the terminal based on the NACK instruction.

Therefore, in a multi-TRP architecture, how to improve HARQ retransmission performance needs to be considered.

SUMMARY

Embodiments of this application provide a retransmission method and an apparatus in a multi-transmission reception point architecture, to improve HARQ retransmission performance in the multi-TRP architecture.

According to a first aspect, a retransmission method in a multi-transmission reception point architecture is provided. The method may be implemented by using the following operations: A network device sends first downlink control information to a terminal on a first control resource, where the first downlink control information is used for scheduling a first transmission version of downlink data; and the terminal receives the first downlink control information from the network device on the first control resource. The network device sends the first transmission version of the downlink data to the terminal, and the terminal receives the first transmission version of the downlink data from the network device based on the first downlink control information. The first transmission version is retransmission data of a second transmission version of the downlink data. Second downlink control information used for scheduling the second transmission version is associated with a second control resource. The first control resource and the second control resource are a same control resource, or the first control resource and the second control resource belong to a same resource group.

In one design, the first control resource and the second control resource are the same control resource, or the first control resource and the second control resource belong to the same resource group, so that two transmission versions of a same piece of downlink data can be sent through a same TRP, and the two transmission versions that are of the same piece of downlink data and that are received by the terminal are from the same TRP. In this way, when verifying a retransmission version of the downlink data, the terminal uses a verification result of a previous transmission version of the downlink data. Because the two transmission versions are from the same TRP, signaling interaction between hardware of different TRPs is not required. This reduces complexity of the terminal, avoids a problem that hardware resources of two different TRPs do not match, and improves HARQ retransmission performance.

In a possible design, the network device further sends configuration information of a plurality of control resources to the terminal, and the terminal receives the configuration information of the plurality of control resources from the network device. Configuration information of control resources belonging to a same resource group includes a same identifier. For example, the plurality of control resources may include the first control resource and the second control resource, and the configuration information may include or indicate resource locations of the first control resource and the second control resource. If the first control resource and the second control resource belong to the same resource group, identifiers included in configuration information of the first control resource and the second control resource are the same. The terminal may determine, based on the identifiers, that the first control resource and the second control resource belong to the same resource group.

In a possible design, the configuration information of the control resource may be a control resource set CORESET, and the configuration information of the plurality of control resources may be a plurality of CORESETs. The CORESET indicates a group of time-frequency resources. The CORESET further includes an identifier. For example, the first control resource is a group of time-frequency resources indicated by a first CORESET, and similarly, the second control resource is a group of time-frequency resources indicated by a second CORESET. An identifier included in the first CORESET is the same as an identifier included in the second CORESET.

Optionally, the identifier is a control resource set pool index (CORESETPoolIndex), and the CORESETPoolIndex included in the first CORESET is the same as the CORESETPoolIndex included in the second CORESET.

In a possible design, the resource group is associated with a TRP. For example, one resource group may be associated with one TRP. Because the first control resource and the second control resource belong to the same resource group, the terminal may determine that the first transmission version scheduled by the first downlink control information and the second transmission version scheduled by the second downlink control information are from the same TRP.

In a possible design, the terminal may further report capability information to the network device, and the network device receives the capability information from the terminal. The capability information indicates that the two transmission versions of the same piece of downlink data from different TRPs are not supported. The network device controls, based on the capability information, a same TRP to transmit different transmission versions of the same piece of downlink data, to ensure HARQ retransmission performance.

In a possible design, the first transmission version is detected based on a detection result of the second transmission version. The detection is used for determining whether the downlink data is successfully received. The detection result of the second transmission version can help improve detection efficiency and performance.

According to a second aspect, a communications apparatus is provided. The communications apparatus may be a terminal, an apparatus (for example, a chip, a chip system, or a circuit) in a terminal, or an apparatus that can be used together with a terminal. In a design, the apparatus may include modules that are in a one-to-one correspondence with the methods/operations/operations/actions performed by the terminal described in the first aspect. The modules may be implemented by a hardware circuit, software, or a combination of a hardware circuit and software. In a design, the apparatus may include a processing module and a communications module. The processing module is configured to invoke the communications module to perform a receiving function and/or a sending function. Further, the communications module may further include a receiving module and a sending module. For example, the processing module is configured to invoke the receiving module to receive first downlink control information from a network device on a first control resource, and receive a first transmission version of downlink data from the network device based on the first downlink control information. The first transmission version is retransmission data of a second transmission version of the downlink data. Second downlink control information used for scheduling the second transmission version is associated with a second control resource. The first control resource and the second control resource are a same control resource, or the first control resource and the second control resource belong to a same resource group.

In a possible design, the processing module is further configured to invoke the receiving module to receive configuration information of a plurality of control resources. Configuration information of control resources belonging to a same resource group includes a same identifier.

In a possible design, the processing module is further configured to invoke the sending module to report capability information to the network device. The capability information indicates that two transmission versions of a same piece of downlink data from different TRPs are not supported.

In a possible design, the processing module is further configured to detect the first transmission version based on a detection result of the second transmission version. The detection is used for determining whether the downlink data is successfully received. The detection result of the second transmission version can help improve detection efficiency and performance.

According to a third aspect, a communications apparatus is provided. The communications apparatus may be a network device, an apparatus (for example, a chip, a chip system, or a circuit) in a network device, or an apparatus that can be used together with a network device. In a design, the apparatus may include modules that are in a one-to-one correspondence with the methods/operations/operations/actions performed by the network device described in the first aspect. The modules may be implemented by a hardware circuit, software, or a combination of a hardware circuit and software. In a design, the apparatus may include a processing module and a communications module. The processing module is configured to invoke the communications module to perform a receiving function and/or a sending function. Further, the communications module may further include a receiving module and a sending module. For example, the processing module is configured to invoke the receiving module to send first downlink control information to a terminal on a first control resource. The first downlink control information is used for scheduling a first transmission version of downlink data.

The processing module is configured to invoke the sending module to send the first transmission version of the downlink data to the terminal. The first transmission version is retransmission data of a second transmission version of the downlink data. Second downlink control information used for scheduling the second transmission version is associated with a second control resource. The first control resource and the second control resource are a same control resource, or the first control resource and the second control resource belong to a same resource group.

In a possible design, the processing module is further configured to invoke the sending module to send configuration information of a plurality of control resources to the terminal. Configuration information of control resources belonging to a same resource group includes a same identifier.

In a possible design, the processing module is further configured to invoke the receiving module to receive capability information reported by the terminal. The capability information indicates that two transmission versions of a same piece of downlink data from different transmission reception points TRPs are not supported.

With reference to the second aspect and the third aspect, the following provides some possible designs of the second aspect or the third aspect.

In a possible design, the configuration information of the control resource may be a control resource set CORESET, and the configuration information of the plurality of control resources may be a plurality of CORESETs. The CORESET indicates a group of time-frequency resources. The CORESET further includes an identifier. For example, the first control resource is a group of time-frequency resources indicated by a first CORESET, and similarly, the second control resource is a group of time-frequency resources indicated by a second CORESET. An identifier included in the first CORESET is the same as an identifier included in the second CORESET.

Optionally, the identifier is a control resource set pool index (CORESETPoolIndex), and the CORESETPoolIndex included in the first CORESET is the same as the CORESETPoolIndex included in the second CORESET.

In a possible design, the resource group is associated with a TRP. For example, one resource group may be associated with one TRP. Because the first control resource and the second control resource belong to the same resource group, the terminal may determine that the first transmission version scheduled by the first downlink control information and the second transmission version scheduled by the second downlink control information are from the same TRP.

For beneficial effects of the second aspect and the third aspect, refer to descriptions of the first aspect. Details are not described again.

According to a fourth aspect, an embodiment of this application provides a communications apparatus. The communications apparatus includes a communications interface and a processor. The communications interface is used by the apparatus to communicate with another device, for example, to send and receive data or signals. For example, the communications interface may be a transceiver, a circuit, a bus, a module, or another type of communications interface, and the another device may be a network device. The processor is configured to invoke a group of programs, instructions, or data, to perform the method performed by the terminal described in the first aspect. The apparatus may further include a memory, configured to store the programs, the instructions, or the data invoked by the processor. The memory is coupled to the processor, and when executing the instruction or the data stored in the memory, the processor can implement the method performed by the terminal described in the first aspect.

According to a fifth aspect, an embodiment of this application provides a communications apparatus. The communications apparatus includes a communications interface and a processor. The communications interface is used by the apparatus to communicate with another device, for example, to send and receive data or signals. For example, the communications interface may be a transceiver, a circuit, a bus, a module, or another type of communications interface, and the another device may be a terminal. The processor is configured to invoke a group of programs, instructions, or data, to perform the method performed by the network device described in the first aspect. The apparatus may further include a memory, configured to store the programs, the instructions, or the data invoked by the processor. The memory is coupled to the processor, and when executing the instruction or the data stored in the memory, the processor can implement the method performed by the network device described in the first aspect.

According to a sixth aspect, an embodiment of this application provides a chip system. The chip system includes a processor, and may further include a memory, configured to implement the method performed by the network device according to any one of the first aspect or the possible designs of the first aspect. The chip system may include a chip, or may include a chip and another discrete component.

According to a seventh aspect, an embodiment of this application provides a chip system. The chip system includes a processor, and may further include a memory, configured to implement the method performed by the terminal according to any one of the first aspect or the possible designs of the first aspect. The chip system may include a chip, or may include a chip and another discrete component.

According to an eighth aspect, an embodiment of this application provides a communications system. The communications system includes a terminal device and a network device. The terminal is configured to perform the method performed by the terminal according to the first aspect, and the network device is configured to perform the method performed by the network device according to the first aspect.

According to a ninth aspect, a computer program product including instructions is provided. When the computer program product is run on a computer, the method according to any one of the first aspect or the possible designs of the first aspect is performed.

According to a tenth aspect, an embodiment of this application further provides a computer-readable storage medium. The computer-readable storage medium stores computer-readable instructions. When the computer-readable instructions are run on a computer, the method according to any one of the first aspect or the possible designs of the first aspect is performed.

DESCRIPTION OF EMBODIMENTS

Embodiments of this application provide a retransmission method and an apparatus in a multi-transmission reception point architecture, to improve HARQ retransmission performance in the multi-TRP architecture. The method and the apparatus are conceived based on a same or similar technical concept. The method and the apparatus have similar principles for resolving the problems. Therefore, for implementation of the apparatus and the method, refer to each other. Details of repeated parts are not described. In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more. In addition, it should be understood that, in the description of this application, terms such as "first", "second", and "third" are merely used for distinguishing and description, but should not be understood as an indication or implication of relative importance, or should not be understood as an indication or implication of a sequence. Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "comprise", "include", "have", and other variants thereof all mean "include but is not limited to", unless otherwise specifically emphasized in another manner.

A reference signal indication method provided in embodiments of this application may be applied to a 5th generation (5G) communications system, for example, 5G new radio (NR), or may be applied to various future communications systems, for example, a 6th generation (6G) communications system.

The following describes in detail embodiments of this application with reference to accompanying drawings.

Figure 1:
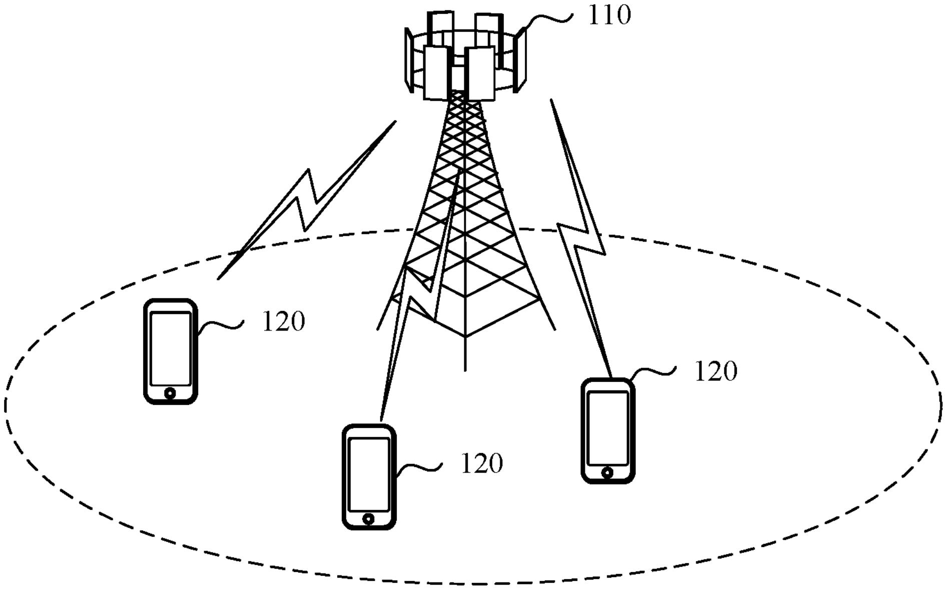
FIG. 1 is a schematic diagram of an architecture of a communications system according to an embodiment of this application.

FIG. 1 shows an architecture of a communications system to which a retransmission method in a multi-transmission reception point architecture is applicable according to an embodiment of this application. The communications system may include a network device 110 and one or more terminal devices 120.

The network device 110 is a node in a radio access network (RAN), and may also be referred to as a base station, an access network device, or a node, or may also be referred to as a RAN node (or a device). Currently, some examples of the node 101 are: a next generation NodeB (gNB), a next generation evolved NodeB (Ng-eNB), a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), a device in a 5G communications system, or a network device in a future possible communications system. The network device 110 may alternatively be a device that functions as a base station in device-to-device (D2D) communication. In this embodiment of this application, when the network device 110 communicates with the terminal device, there may be one or more network devices, and the network devices may locate in a same cell, or may locate in different cells.

The terminal device 120 may also be referred to as user equipment (UE), a mobile station (MS), a mobile terminal (MT), or the like, and is a device that provides a user with voice or data connectivity, or may be an internet of things device. For example, the terminal device 120 includes a handheld device, a vehicle-mounted device, or the like that has a wireless connection function. Currently, the terminal device 120 may be a mobile phone, a tablet computer, a notebook computer, a palmtop computer, a mobile internet device (MID), a wearable device (for example, a smart watch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or the like. Alternatively, the terminal device 120 may be a device that functions as a terminal in D2D communication.

Transmission between the network device 110 and the terminal device 120 may be performed through a radio wave, or may be performed through a transmission medium such as visible light, a laser, infrared, or an optical fiber. In this embodiment of this application, an example in which a device implementing a function of the terminal device 120 is referred to as a terminal is used for description.

Embodiments of this application are applicable to scenarios in which there is one or more sending/receiving apparatuses, and a scenario derived from any one of the scenarios. The sending/receiving apparatus may be a transmission reception point (TRP), or may be a remote radio unit (RRU), or the like. In a scenario in which there are a plurality of TRPs, the plurality of TRPs may be connected to a same baseband unit (BBU), or may be connected to different BBUs. The plurality of TRPs herein may belong to a same cell, or may belong to different cells.

Figure 2:
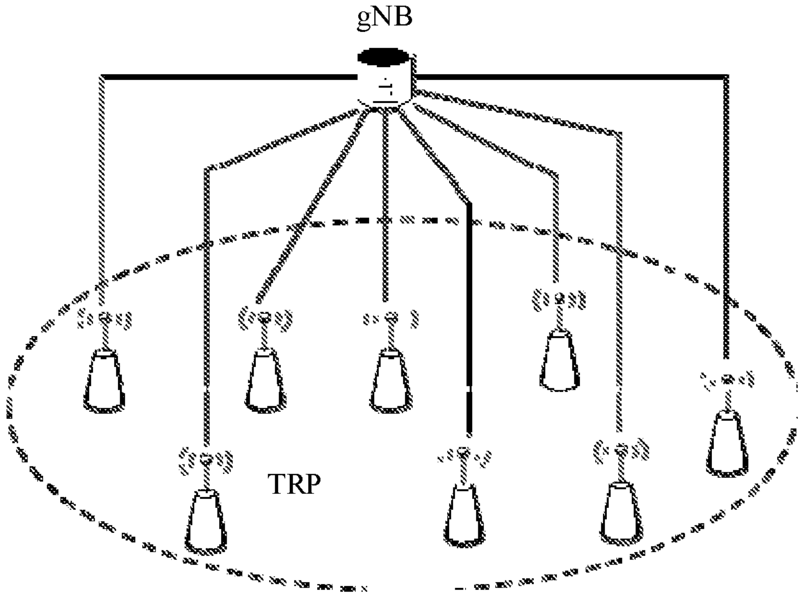
FIG. 2 is a schematic diagram of a multi-TRP architecture according to an embodiment of this application.

As shown in FIG. 2, there are a plurality of TRPs in one gNB, and a network device may communicate with a terminal through any TRP.

In some application scenarios, the terminal device may communicate with a plurality of nodes. For example, in a multi-transmission reception point (Multi-TRP) scenario, the terminal device may communicate with the plurality of TRPs.

To better understand the solutions provided in embodiments of this application, the following first describes downlink scheduling in a multi-TRP structure.

The network device sends configuration information of a control resource to the terminal. The configuration information of the control resource is used for transmitting downlink control information (DCI). The terminal may determine, based on the configuration information of the control resource, a resource location for receiving the DCI. The DCI is used for scheduling downlink data transmission. For example, the DCI may be used for scheduling transmission of a physical downlink shared channel (PDSCH). The terminal may determine, based on the received DCI, a resource location for receiving downlink data, to correctly receive the downlink data from the network device.

Figure 3:
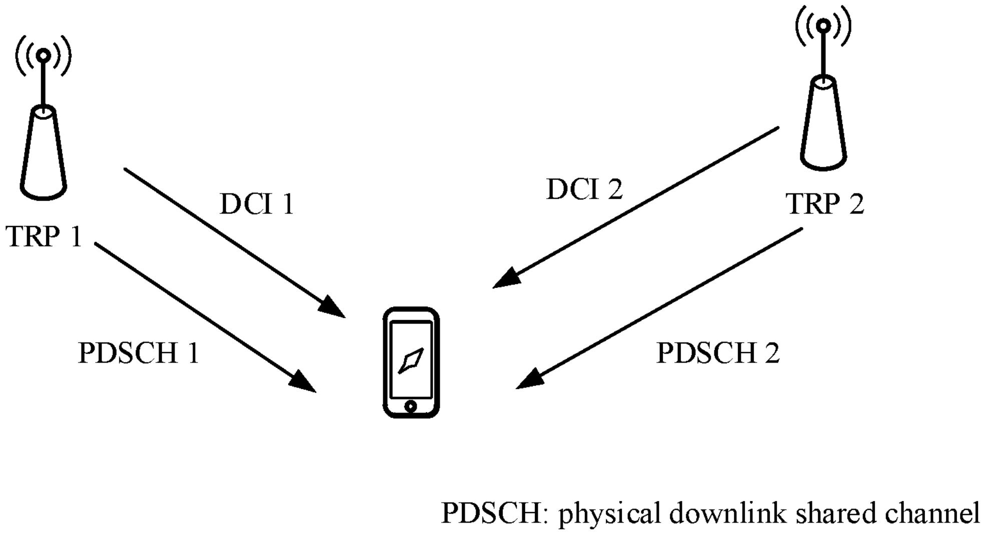
FIG. 3 is a schematic diagram of scheduling downlink data in a multi-DCI mode according to an embodiment of this application.

In the multi-TRP structure, in an implementation, the downlink data may be scheduled in a multi-DCI mode. Specifically, each TRP may separately send DCI to the terminal. The terminal may receive downlink data of a corresponding TRP based on the DCI from each TRP. As shown in FIG. 3, two TRPs are used as an example, and a TRP 1 and a TRP 2 are separately used to indicate the two TRPs. The TRP 1 may send DCI 1 to the terminal. The DCI 1 is used for scheduling the terminal to receive a PDSCH 1. The TRP 2 may send DCI 2 to the terminal. The DCI 2 is used for scheduling the terminal to receive a PDSCH 2.

To improve data transmission reliability, a HARQ retransmission technology may be used. In a transmission scenario of a plurality of TRPs, initial transmission and retransmission of a same transport block (TB) of the terminal may occur on different TRPs. For example, the TRP 1 sends initial transmission data of a TB to the terminal, and the TRP 2 sends retransmission data of the TB to the terminal.

When performing detection on the retransmission data, the terminal uses a detection result of the initial transmission data, to improve detection accuracy. If initial transmission and retransmission of the same TB of the terminal occur on the different TRPs, the terminal may use different hardware resources when processing data of the different TRPs. For example, hardware resources used by the terminal to process data of the TRP 1 and data of the TRP 2 are different, and processing capabilities of the different hardware resources are different. For example, it is stipulated in NR that in a multi-TRP transmission mode in which a PDSCH is scheduled based on multi-DCI, a quantity of blind detection times required by the terminal to process DCI sent by a TRP may exceed a maximum quantity of blind detection times specified in a protocol. This means that the terminal processes a signal from the TRP by using a hardware resource having a higher processing capability. If a processing capability of a hardware resource for processing the initial transmission data is stronger, because processing capabilities of hardware resources for the initial transmission data and the retransmission data are similar, the hardware resource may fail to meet a complexity requirement for processing the retransmission data.

Figure 4:
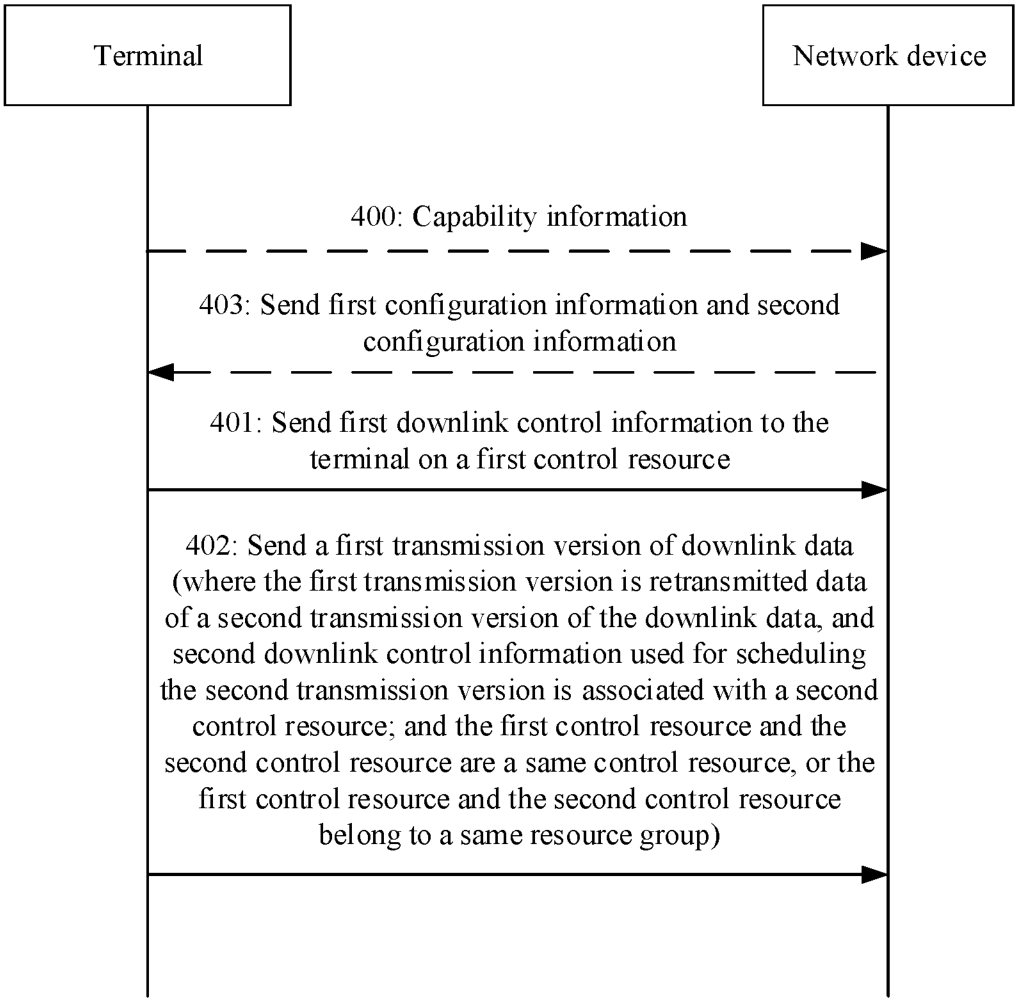
FIG. 4 is a schematic flowchart of a retransmission method in a multi-transmission reception point architecture according to an embodiment of this application.

As shown in FIG. 4, an embodiment of this application provides a retransmission method in a multi-transmission reception point architecture, to improve HARQ retransmission performance in the multi-TRP architecture.

S401: A network device sends first downlink control information to a terminal on a first control resource, and the terminal receives first DCI from the network device on the first control resource.

S402: The network device sends a first transmission version of downlink data to the terminal, and the terminal receives the first transmission version of the downlink data from the network device based on the first DCI.

In a HARQ retransmission technology, one piece of downlink data may have a plurality of transmission versions. Different transmission versions are used for initial transmission and retransmission. There may be one or more retransmissions, and a different transmission version is used for each retransmission. The terminal may perform verification based on the transmission version received each time, to correctly parse the downlink data. For example, after error correction coding is completed for a same piece of downlink data, a plurality of redundancy versions (RV) are obtained, and each redundancy version corresponds to a transmission version of the downlink data.

The downlink data may use a TB as a transmission unit.

In this embodiment of this application, the first transmission version of the downlink data is a retransmission version or retransmission data of a second transmission version of the downlink data. To be specific, before receiving the first transmission version of the downlink data, the terminal further receives the second transmission version of the downlink data from the network device. The second transmission version may be initial transmission data or retransmission data of the downlink data. When receiving the second transmission version of the downlink data and determining, through verification, that the second transmission version is incorrect, the terminal may send a NACK to the network device, to indicate that the receiving fails. The network device sends the first transmission version of the downlink data to the terminal based on a NACK instruction.

Before sending the first transmission version of the downlink data, the network device needs to send scheduling information of the first transmission version, that is, the first DCI. The first DCI is associated with the first control resource. To be specific, the first DCI is transmitted on the first control resource, and the terminal detects the first DCI on the first control resource. Similarly, second DCI used for scheduling the second transmission version is associated with a second control resource.

In this embodiment of this application, the first control resource and the second control resource are a same control resource, or the first control resource and the second control resource belong to a same resource group. The resource group is associated with a TRP.

TRPs that send DCI by using a same resource group are the same. For example, a first resource group is associated with a first TRP. In this case, both the first transmission version and the second transmission version of the downlink data are sent through the first TRP.

The first control resource and the second control resource are designed as the same control resource, or the first control resource and the second control resource are designed to belong to the same resource group, so that it can be ensured that a retransmission version and a previous transmission version of a same piece of downlink data are from a same TRP.

Optionally, before S401, the method further includes S403.

S403: The network device sends configuration information of a plurality of control resources to the terminal. The terminal receives the configuration information of the plurality of control resources from the network device.

The configuration information of the control resource includes an identifier. Configuration information of control resources belonging to a same resource group includes a same identifier.

The configuration information of the plurality of control resources may be carried in a same message, or may be carried in different messages.

The configuration information of the plurality of control resources may include first configuration information of the first control resource and second configuration information of the second control resource.

The terminal determines, based on the first configuration information, a receive parameter required for receiving the first DCI. The receive parameter required for receiving the first DCI may include a time-frequency resource range for receiving the first DCI. The terminal may receive the first DCI based on the receive parameter, and further determine related information of downlink scheduling of the first transmission version based on the first DCI.

Alternatively, the terminal may determine, based on the second configuration information, a receive parameter required for receiving the second DCI. The receive parameter required for receiving the second DCI may include a time-frequency resource range for receiving the second DCI. The terminal may receive the second DCI based on the receive parameter, and further determine related information of downlink scheduling of the second transmission version based on the second DCI.

An identifier included in the first configuration information is the same as an identifier included in the second configuration information. The identifier indicates a resource group to which the control resource belongs.

Generally, the configuration information of the control resource may be a control resource set (CORESET), and the CORESET may indicate a group of time-frequency resources. For example, the CORESET may indicate a time-frequency resource range occupied by the control resource. The terminal may determine, based on the CORESET, a time-frequency resource range for receiving the downlink control information. For example, the first configuration information of the first control resource is a first CORESET, and the first control resource is a time-frequency resource indicated by the first CORESET. The second configuration information of the second control resource is a second CORESET, and the second control resource is a time-frequency resource indicated by the second CORESET.

The time-frequency resource indicated by the first CORESET and the time-frequency resource indicated by the second CORESET belong to a same resource group, and the resource group may be a control resource set pool (CORESETPool). The time-frequency resource indicated by the first CORESET and the time-frequency resource indicated by the second CORESET belong to a same CORESETPool. The control resource set pool (CORESETPool) may be distinguished by using a control resource set pool index (CORESETPoolIndex).

The identifier included in the configuration information of the control resource may be a CORESETPoolIndex. An identifier included in the first CORESET is the same as an identifier included in the second CORESET. That is, a CORESETPoolIndex included in the first CORESET is the same as a CORESETPoolIndex included in the second CORESET.

In physical downlink control channel (PDCCH) configuration information (PDCCH-Config) configured for the terminal, the network device configures a time-frequency resource for the terminal by using a plurality of CORESETs. Each CORESET corresponds to one group of time-frequency resources, each CORESET includes one identifier. The identifier may be a CORESETPoolIndex. The terminal receives the DCI on time-frequency resources indicated by these CORESETs. When CORESETPoolIndexes included in CORESETs corresponding to resources in which the received DCI is located are different, it indicates that the two pieces of DCI are from different TRPs. Generally, to avoid a performance loss, a PDSCH and DCI for scheduling the PDSCH are from a same TRP. In this way, when the CORESETPoolIndexes included in the CORESETs corresponding to the resources in which the received DCI is located are different, PDSCHs scheduled by using the two pieces of DCI are also from different TRPs. On the contrary, it is designed that CORESETPoolIndexes included in the first CORESET and the second CORESET are the same, which means that two transmission versions of same downlink data are from a same TRP.

The identifier included in the configuration information of the control resource may be a CORESETPoolIndex. A CORESETPoolIndex included in the first configuration information of the first control resource is the same as a CORESETPoolIndex included in the second configuration information of the second control resource.

Optionally, before S401, the method further includes S400.

S400: The terminal sends capability information to the network device, and the network device receives the capability information from the terminal.

The capability information indicates that the terminal does not support that two transmission versions of a same piece of downlink data are from different TRPs.

Alternatively, the capability information indicates that the terminal does not support receiving of the two transmission versions of the same piece of downlink data through the different TRPs.

The capability information may occupy one bit. For example, when a bit value is 1, it indicates that the terminal does not support that the two transmission versions of the same piece of downlink data are from the different TRPs; or when a bit value is 0, it indicates that the terminal supports that the two transmission versions of the same piece of downlink data are from the different TRPs.

The network device may send, based on the capability information of the terminal, the different transmission versions of the same piece of downlink data through a same TRP when the terminal does not support that the two transmission versions of the same piece of downlink data are from the different TRPs.

A sequence of performing S400 and S403 is not limited in this embodiment of this application.

In this embodiment of this application, the first control resource and the second control resource are the same control resource, or the first control resource and the second control resource belong to the same resource group, so that the two transmission versions of the same piece of downlink data can be sent through the same TRP, and the two transmission versions that are of the same piece of downlink data and that are received by the terminal are from the same TRP. In this way, when verifying a retransmission version of the downlink data, the terminal uses a verification result of a previous transmission version of the downlink data. Because the two transmission versions are from the same TRP, signaling interaction between hardware of different TRPs is not required. This reduces complexity of the terminal, avoids a problem that hardware resources of two different TRPs do not match, and improves HARQ retransmission performance.

Figure 5:
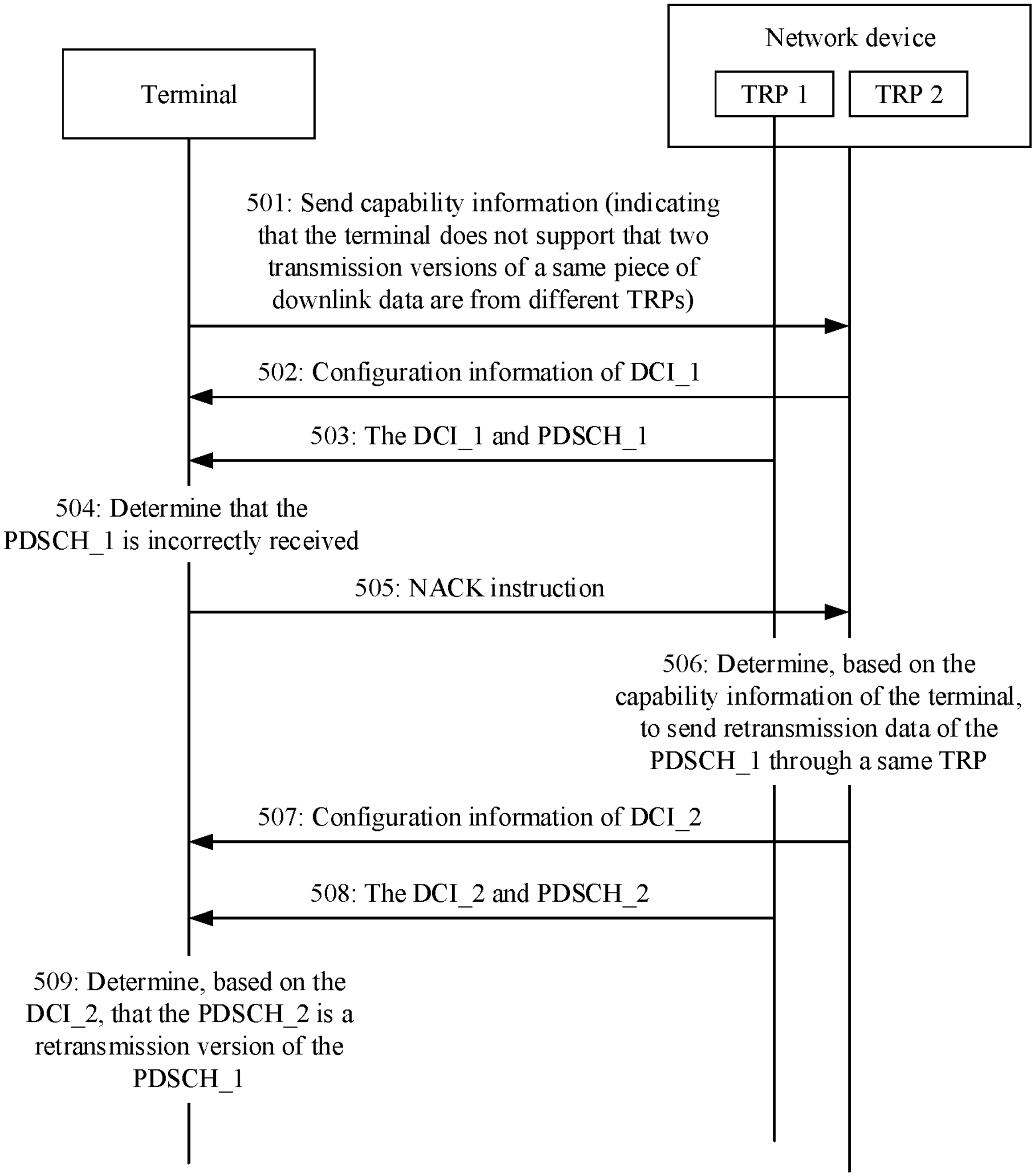
FIG. 5 is a schematic flowchart of an example of a retransmission method in a multi-transmission reception point architecture according to an embodiment of this application.

Based on the foregoing embodiment, as shown in FIG. 5, the following further describes in detail the method provided in this embodiment of this application with reference to a specific application scenario.

S501: A terminal sends capability information to a network device, and the network device receives the capability information from the terminal.

The capability information indicates that the terminal does not support that two transmission versions of a same piece of downlink data are from different TRPs.

S502: The network device sends configuration information of DCI_1 to the terminal, and the terminal receives the configuration information of the DCI_1 from the network device.

The configuration information of the DCI_1 is used for configuring a resource of the DCI_1. The configuration information of the DCI_1 includes a parameter CORESETPoolIndex.

S503: A TRP_1 sends the DCI_1 and a PDSCH_1 to the terminal, and the terminal receives the DCI_1 and the PDSCH_1 from the TRP_1 based on the configuration information of the DCI_1. The DCI_1 is used for scheduling the PDSCH_1.

The terminal obtains, from the DCI_1, a HARQ process number and a new data indicator (NDI) that correspond to the PDSCH 1.

S504: The terminal determines that the PDSCH_1 is incorrectly received.

The terminal may determine, through verification, whether the PDSCH 1 is successfully received.

S505: The terminal sends a NACK instruction to the network device, and the network device receives the NACK instruction from the terminal.

The NACK instruction indicates that the PDSCH_1 is incorrectly received.

S506: The network device determines, based on the capability information of the terminal, to send retransmission data of the PDSCH_1 through a same TRP.

S507: The network device sends configuration information of DCI_2 to the terminal, and the terminal receives the configuration information of the DCI_2 from the network device.

The configuration information of the DCI_2 is used for configuring a resource of the DCI_2, and a CORESETPoolIndex included in the configuration information of the DCI_2 is the same as a CORESETPoolIndex included in the configuration information of the DCI_1.

S508: The TRP_1 sends the DCI_2 and PDSCH_2 to the terminal, and the terminal receives the DCI_2 and the PDSCH_2 from the TRP_1. The DCI_2 is used for scheduling the PDSCH 2.

S509: The terminal determines, based on the DCI_2, that the PDSCH 2 is a retransmission version of the PDSCH_1.

The terminal obtains, from the DCI_2, a HARQ process number and an NDI that correspond to the PDSCH_2. If determining that the HARQ process number corresponding to the PDSCH_2 indicated in the DCI_2 is the same as the HARQ process number corresponding to the PDSCH_1, and the NDI included in the DCI_2 is not flipped compared with the NDI included in the DCI_1, the terminal determines that the PDSCH_2 is the retransmission version of the PDSCH_1.

The NDI may be indicated by using one bit. If both a bit value indicating the NDI in the DCI_2 and a bit value indicating the NDI in the DCI_1 are 1 or 0, it indicates that the NDI is not flipped.

In this embodiment of this application, when sending information to the terminal, the network device may perform transmission through any TRP.

In the foregoing embodiments provided in this application, the methods provided in embodiments of this application are described from perspectives of the network device, the terminal, and interaction between the network device and the terminal. To implement functions in the method provided in the foregoing embodiments of this application, the network device and the terminal may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 6:
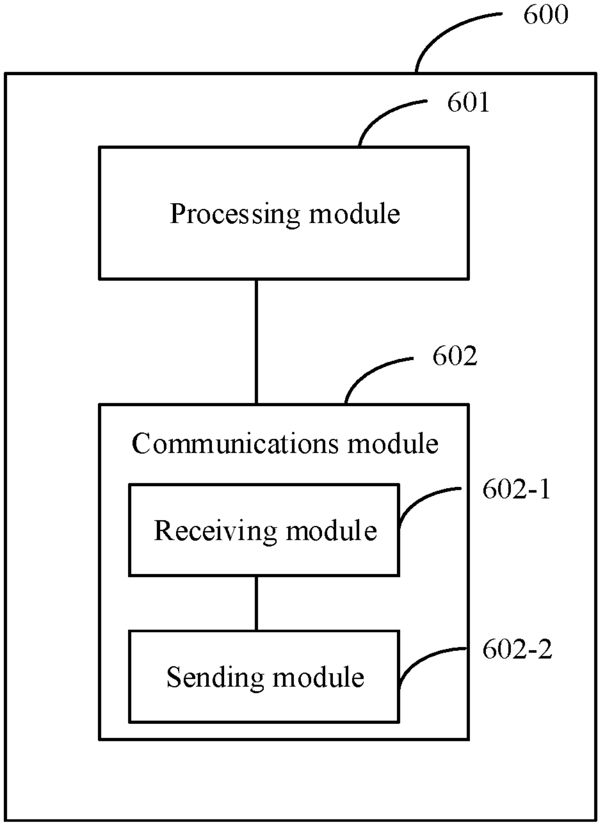
FIG. 6 is a schematic diagram of a structure of a communications apparatus according to an embodiment of this application.

As shown in FIG. 6, based on a same technical concept, an embodiment of this application further provides a communications apparatus 600. The communications apparatus 600 may be a terminal or a network device, an apparatus in a terminal or a network device, or an apparatus that can be used together with a terminal or a network device. In a design, the communications apparatus 600 may include modules that are in a one-to-one correspondence with the methods/operations/operations/actions performed by the terminal or the network device in the foregoing method embodiments. The modules may be implemented by a hardware circuit, software, or a combination of a hardware circuit and software. In a design, the communications apparatus may include a processing module 601 and a communications module 602. The processing module 601 is configured to invoke the communications module 602 to perform a receiving and/or sending function. The communications module 602 may further include a receiving module 602-1 and a sending module 602-2.

When being configured to perform the method performed by a terminal, the processing module 601 is configured to invoke the receiving module 602-1 to receive first downlink control information from a network device on a first control resource, and receive a first transmission version of downlink data from the network device based on the first downlink control information. The first transmission version is retransmission data of a second transmission version of the downlink data. Second downlink control information used for scheduling the second transmission version is associated with a second control resource. The first control resource and the second control resource are a same control resource, or the first control resource and the second control resource belong to a same resource group.

When being configured to perform the method performed by the network device, the processing module 601 is configured to invoke the receiving module 602-1 to send the first downlink control information to the terminal on the first control resource. The first downlink control information is used for scheduling the first transmission version of the downlink data.

The processing module 601 is configured to invoke the sending module 602-2 to send the first transmission version of the downlink data to the terminal. The first transmission version is the retransmission data of the second transmission version of the downlink data. The second downlink control information used for scheduling the second transmission version is associated with the second control resource. The first control resource and the second control resource are the same control resource, or the first control resource and the second control resource belong to the same resource group.

The communications module 602 is further configured to perform an operation related to signal receiving or sending performed by the terminal or the network device in the foregoing method embodiments. The processing module 601 is further configured to perform another operation other than signal receiving and sending performed by the terminal or the network device in the foregoing method embodiments. Details are not described herein again.

Division into the modules in embodiments of this application is an example, is merely division into logical functions, and may be other division during actual implementation. In addition, function modules in embodiments of this application may be integrated into one processor, or each of the modules may exist alone physically, or two or more modules may be integrated into one module. The integrated module may be implemented in a form of hardware, or may be implemented in a form of a software function module.

Figure 7:
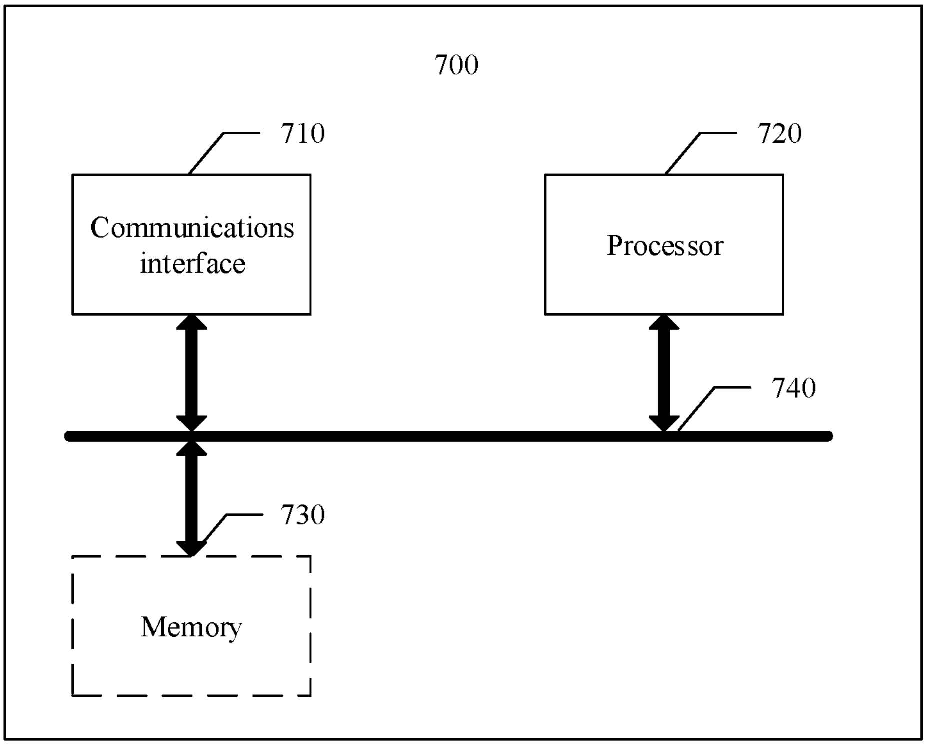
FIG. 7 is a schematic diagram of a structure of another communications apparatus according to an embodiment of this application.

FIG. 7 shows a communications apparatus 700 according to an embodiment of this application. The communications apparatus 700 is configured to implement functions of the terminal or the network device in the foregoing method. When implementing the functions of the network device, the apparatus may be a network device, an apparatus in a network device, or an apparatus that can be used together with a network device. When implementing the functions of the terminal, the apparatus may be a terminal, an apparatus in a terminal, or an apparatus that can be used together with a terminal. The communications apparatus may be a chip system. In this embodiment of this application, the chip system may include a chip, or may include a chip and another discrete component. The communications apparatus 700 includes at least one processor 720, configured to implement the functions of the terminal or the network device in the method provided in embodiments of this application. The communications apparatus 700 may further include a communications interface 710. In embodiments of this application, the communications interface may be a transceiver, a circuit, a bus, a module, or a communications interface of another type, and is configured to communicate with another device by using a transmission medium. For example, the communications interface 710 is used for an apparatus in the communications apparatus 700 to communicate with another device. For example, when the communications apparatus 700 is a network device, the another device may be a terminal device. When the communications apparatus 700 is a terminal device, the another apparatus may be a network device. The processor 720 receives and sends data through the communications interface 710, and is configured to implement the methods in the foregoing method embodiments. For example, when implementing the function of the network device, the processor 720 is configured to send first downlink control information to the terminal on a first control resource through the communications interface, where the first downlink control information is used for scheduling a first transmission version of downlink data; and send the first transmission version of the downlink data to the terminal. The first transmission version is retransmission data of a second transmission version of the downlink data. Second downlink control information used for scheduling the second transmission version is associated with a second control resource. The first control resource and the second control resource are a same control resource, or the first control resource and the second control resource belong to a same resource group. When implementing the function of the terminal, the processor 720 is configured to receive the first downlink control information from the network device on the first control resource through the communications interface 710, and receive the first transmission version of the downlink data from the network device based on the first downlink control information. The first transmission version is the retransmission data of the second transmission version of the downlink data. The second downlink control information used for scheduling the second transmission version is associated with the second control resource. The first control resource and the second control resource are the same control resource, or the first control resource and the second control resource belong to the same resource group.

The processor 720 and the communications interface 710 may be further configured to perform other corresponding operations or operations performed by the terminal or the network device in the foregoing method embodiments. Details are not described herein again.

The communications apparatus 700 may further include at least one memory 730, configured to store program instructions and/or data. The memory 730 is coupled to the processor 720. Coupling in this embodiment of this application is indirect coupling or a communication connection between apparatuses, units, or modules, may be in electrical, mechanical, or other forms, and is used for information exchange between the apparatuses, the units, and the modules. The processor 720 may cooperate with the memory 730. The processor 720 may execute the program instruction stored in the memory 730. At least one of the at least one memory may be included in the processor.

A specific connection medium between the communications interface 710, the processor 720, and the memory 730 is not limited in this embodiment of this application. In this embodiment of this application, the memory 730, the processor 720, and the communications interface 710 are connected through a bus 740 in FIG. 7, and the bus is represented by a bold line in FIG. 7. A manner of a connection between other components is merely an example for description, and is not limited thereto. The bus may be classified into an address bus, a data bus, a control bus, and the like. For ease of representation, only one bold line is used for representation in FIG. 7, but this does not mean that there is only one bus or only one type of bus.

When the apparatus 600 and the apparatus 700 are chips or chip systems, the communications module 602 and the communications interface 710 may output or receive baseband signals. When the apparatus 600 and the apparatus 700 are devices, the communications module 602 and the communications interface 710 may output or receive radio frequency signals. In this embodiment of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, operations, and logical block diagrams disclosed in embodiments of this application. The general-purpose processor may be a microprocessor or any conventional processor or the like. The operations of the methods disclosed with reference to embodiments of this application may be directly performed and completed by a hardware processor, or may be performed and completed by using a combination of hardware and software modules in the processor.

In this embodiment of this application, the memory 730 may be a nonvolatile memory, for example, a hard disk drive (HDD) or a solid-state drive (SSD), or may be a volatile memory, for example, a random-access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

Some or all of the operations and functions that are performed by the terminal and that are described in the foregoing method embodiments of this application, or some or all of the operations and functions that are performed by the network device and that are described in the foregoing method embodiments of this application may be completed by using a chip or an integrated circuit.

To implement the functions of the communications apparatus in FIG. 6 or FIG. 7, an embodiment of this application further provides a chip, including a processor, configured to support the communications apparatus in implementing the functions of the terminal or the network device in the foregoing method embodiments. In a possible design, the chip is connected to a memory or the chip includes the memory, and the memory is configured to store program instructions and data that are necessary for the communications apparatus.

An embodiment of this application provides a computer-readable storage medium that stores a computer program. The computer program includes instructions used to perform the foregoing method embodiments.

An embodiment of this application provides a computer program product including instructions. When the computer program product runs on a computer, the foregoing method embodiments are performed.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and operations are performed on the computer or the another programmable device, to generate computer-implemented processing. Therefore, the instructions executed on the computer or the another programmable device provide operations for implementing a specific function in one or more procedures in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

It is clear that a person skilled in the art can make various modifications and variations to embodiments of this application without departing from the spirit and scope of embodiments of this application. In this case, this application is intended to cover these modifications and variations of embodiments of this application provided that they fall within the scope of protection defined by the following claims and their equivalent technologies.

What is claimed is:

1. A retransmission method in a multi-transmission reception point architecture, wherein the method is applied to a communication apparatus and comprises:
receiving first downlink control information (DCI) from a network device on a first control resource; and
receiving a first transmission version of downlink data from the network device based on the first DCI,
wherein the first transmission version of the downlink data is retransmission data of a second transmission version of the downlink data,
wherein the second transmission version of the downlink data is an initial transmission of the downlink data,
wherein second DCI for scheduling the second transmission version is associated with a second control resource, and
wherein the first control resource and the second control resource belong to a same resource group.

2. The method according to claim 1, further comprising:
receiving configuration information of the first control resource and the second control resource, wherein configuration information of each control resource belonging to the same resource group comprises a same identifier.

3. The method according to claim 2, wherein the configuration information of the control resource is a control resource set (CORESET).

4. The method according to claim 2, wherein the identifier is a control resource set pool index (CORESETPoolIndex).

5. The method according to claim 1, wherein the resource group is associated with a transmission reception point (TRP).

6. The method according to claim 1, further comprising reporting capability information to the network device,
wherein the capability information indicates that two transmission versions of a same piece of downlink data scheduled by (DCI) associated with different CORESETPoolIndex are not supported.

7. The method according to claim 1, wherein a hybrid automatic repeat request (HARQ) process number corresponding to the first transmission version of the downlink data is the same as the HARQ process number corresponding to the second transmission version of the downlink data, and
wherein a new data indicator (NDI) in the first DCI is not flipped compared with a NDI in the second DCI.

8. A retransmission method in a multi-transmission reception point architecture, wherein the method is applied to a communication apparatus and comprises:
sending first downlink control information (DCI) to a terminal on a first control resource,
wherein the first DCI is for scheduling a first transmission version of downlink data; and
sending the first transmission version of the downlink data to the terminal,
wherein the first transmission version is retransmission data of a second transmission version of the downlink data,
wherein the second transmission version of the downlink data is an initial transmission of the downlink data,
wherein second DCI for scheduling the second transmission version is associated with a second control resource, and
wherein the first control resource and the second control resource belong to a same resource group.

9. The method according to claim 8, further comprising sending configuration information of the first control resource and the second control resource to the terminal,
wherein configuration information of each control resource belonging to the same resource group comprises a same identifier.

10. The method according to claim 9, wherein the configuration information of the control resource is a control resource set (CORESET).

11. The method according to claim 9, wherein the identifier is a control resource set pool index (CORESETPoolIndex).

12. The method according to claim 8, wherein the resource group is associated with a transmission reception point (TRP).

13. The method according to claim 8, further comprising receiving capability information from the terminal,
wherein the capability information indicates that two transmission versions of a same piece of downlink data scheduled by DCI associated with different control resource set pool indexes (CORESETPoolIndex) are not supported.

14. The method according to claim 8, wherein a hybrid automatic repeat request (HARQ) process number corresponding to the first transmission version of the downlink data is the same as the HARQ process number corresponding to the second transmission version of the downlink data, and wherein a new data indicator (NDI) in the first DCI is not flipped compared with a NDI in the second DCI.

15. A communications apparatus comprising:

at least one processor; and one or more memories coupled to the at least one processor, and storing programming instructions, which are executed by the at least one processor, and cause the communications apparatus to:

receive first downlink control information (DCI) from a network device on a first control resource; and receive a first transmission version of downlink data from the network device based on the first DCI, wherein the first transmission version of the downlink data is retransmission data of a second transmission version of the downlink data, wherein the second transmission version of the downlink data is an initial transmission of the downlink data, wherein second DCI for scheduling the second transmission version is associated with a second control resource, and wherein the first control resource and the second control resource belong to a same resource group.

16. The communications apparatus according to claim 15, wherein the programming instructions, which are executed by the at least one processor, further cause the communications apparatus to:

receive configuration information of the first control resource and the second control resource, wherein configuration information of each control resource belonging to the same resource group comprises a same identifier.

17. The communications apparatus according to claim 16, wherein the configuration information of the control resource comprises is a control resource set (CORESET).

18. The communications apparatus according to claim 16, wherein the identifier is a control resource set pool index (CORESETPoolIndex).

19. The communications apparatus according to claim 15, wherein the resource group is associated with a transmission reception point (TRP).

20. The communications apparatus according to claim 15, wherein the programming instructions, which are executed by the at least one processor, further cause the communications apparatus to report capability information to the network device, wherein the capability information indicates that two transmission versions of a same piece of downlink data scheduled by DCI associated with different control resource set pool indexes (CORESETPoolIndex) are not supported.

21. The apparatus according to claim 15, wherein a hybrid automatic repeat request (HARQ) number corresponding to the first transmission version of the downlink data is the same as the HARQ process number corresponding to the second transmission version of the downlink data, and wherein a new data indicator (NDI) in the first DCI is not flipped compared with a NDI in the second DCI.

22. A communications apparatus comprising:

at least one processor; and one or more memories coupled to the at least one processor, and storing programming instructions, which are executed by the at least one processor, and cause the communications apparatus to:

send first downlink control information (DCI) to a terminal on a first control resource, wherein the first DCI is for scheduling a first transmission version of downlink data; and send the first transmission version of the downlink data to the terminal, wherein the first transmission version of the downlink data is retransmission data of a second transmission version of the downlink data, wherein the second transmission version of the downlink data is an initial transmission of the downlink data, wherein second DCI for scheduling the second transmission version is associated with a second control resource, and wherein the first control resource and the second control resource belong to a same resource group.

23. The communications apparatus according to claim 22, wherein the programming instructions, which are executed by the at least one processor, further cause the communications apparatus to send configuration information of the first control resource and the second control resource to the terminal, wherein configuration information of each control resource belonging to the same resource group comprises a same identifier.

24. The communications apparatus according to claim 23, wherein the configuration information of the control resource comprises is a control resource set (CORESET).

25. The communications apparatus according to claim 23, wherein the identifier is a control resource set pool index (CORESETPoolIndex).

26. The communications apparatus according to claim 22, wherein the resource group is associated with a transmission reception point (TRP).

27. The communications apparatus according to claim 22, wherein the programming instructions, which are executed by the at least one processor, further cause the communications apparatus to receive capability information from the terminal, wherein the capability information indicates that two transmission versions of a same piece of downlink data scheduled by DCI associated with different control resource set pool indexes (CORESETPoolIndex) are not supported.

28. The apparatus according to claim 22, wherein a hybrid automatic repeat request (HARQ) process number corresponding to the first transmission version of the downlink data is the same as the HARQ process number corresponding to the second transmission version of the downlink data, and wherein a new data indicator (NDI) in the first DCI is not flipped compared with a NDI in the second DCI.

29. A communications system comprising a first communications apparatus and a second communications apparatus, wherein the first communications apparatus comprises at least a first processor, and one or more first memories coupled to the at least the first processor for storing first programming instructions, which are executed by the at least first processor, causing the first communications apparatus to:

receive first downlink control information (DCI) from a network device on a first control resource; and receive a first transmission version of downlink data from the network device based on the first DCI, wherein the first transmission version of the downlink data is retransmission data of a second transmission version of the downlink data, wherein the second transmission version of the downlink data is an initial transmission of the downlink data, wherein second DCI for scheduling the second transmission version is associated with a second control resource, and wherein the first control resource and the second control resource belong to a same resource group; and wherein the second communications apparatus comprises at least a second processor, and one or more second memories coupled to the at least the second processor for storing second programming instructions, which are executed by the at least the second processor, causing the second communications apparatus to:

send the first DCI to a terminal on the first control resource, wherein the first DCI is for scheduling the first transmission version of the downlink data; and send the first transmission version of the downlink data to the terminal.

30. A computer-readable storage medium storing computer-readable instructions, which are run by at least one processor of a communications apparatus, causing the communications apparatus to:

receive first downlink control information (DCI) from a network device on a first control resource; and receive a first transmission version of downlink data from the network device based on the first DCI, wherein the first transmission version of the downlink data is retransmission data of a second transmission version of the downlink data, wherein the second transmission version of the downlink data is an initial transmission of the downlink data, wherein second DCI for scheduling the second transmission version is associated with a second control resource, and wherein the first control resource and the second control resource belong to a same resource group.

31. A computer-readable storage medium, storing computer-readable instructions, which are run by at least one processor of a communications apparatus, causing the communications apparatus to:

send first downlink control information (DCI) to a terminal on a first control resource, wherein the first DCI is for scheduling a first transmission version of downlink data;

send the first transmission version of the downlink data to the terminal, wherein the first transmission version is retransmission data of a second transmission version of the downlink data, wherein the second transmission version of the downlink data is an initial transmission of the downlink data, wherein second DCI for scheduling the second transmission version is associated with a second control resource, and wherein the first control resource and the second control resource belong to a same resource group.

* * * * *